United States Patent [19]
Ushiyama et al.

[11] Patent Number: 5,453,675
[45] Date of Patent: Sep. 26, 1995

[54] ARRANGEMENT USING SENSED MAGNETIC FLUX FOR RATE DAMPING AND VIBRATION SUPPRESSION

[76] Inventors: Randall K. Ushiyama, 21306 Halldale Ave., Torrance, Calif. 90501; Eric C. Mathisen, 6823 Bliss Ter., Brooklyn, N.Y. 11220; Michael K. Scruggs, 20 Park Ave., Pompton Plains, N.J. 07444; Eric Hahn, 21 Fern St., Woodcliff Lake, N.J. 07675

[21] Appl. No.: 322,639

[22] Filed: Oct. 13, 1994

[51] Int. Cl.⁶ ..................................... G05B 5/01
[52] U.S. Cl. ............................. 318/611; 310/51
[58] Field of Search ........................ 318/611, 649, 318/448, 460, 114, 128, 135; 310/51, 90, 90.5; 248/550; 280/707

[56] References Cited

U.S. PATENT DOCUMENTS

| | | |
|---|---|---|
| 4,746,143 | 5/1988 | Okamoto et al. . |
| 4,935,838 | 6/1990 | Barger et al. . |
| 5,071,159 | 12/1991 | Kamimura et al. . |
| 5,306,975 | 4/1994 | Bichler . |
| 5,387,851 | 2/1995 | Nuscheler et al. . |

*Primary Examiner*—Bentsu Ro
*Attorney, Agent, or Firm*—Howard G. Massung

[57] ABSTRACT

Flux information in a magnetic circuit such as may be used for rate damping and vibration suppression in a magnetic forcer system is sensed and is used in conjunction with a differentiated forcer position signal to provide a rate damping signal. The sensed magnetic flux is used to synthesize an inertial velocity signal which is applied as a position rate damping input to a closed position control loop.

12 Claims, 4 Drawing Sheets

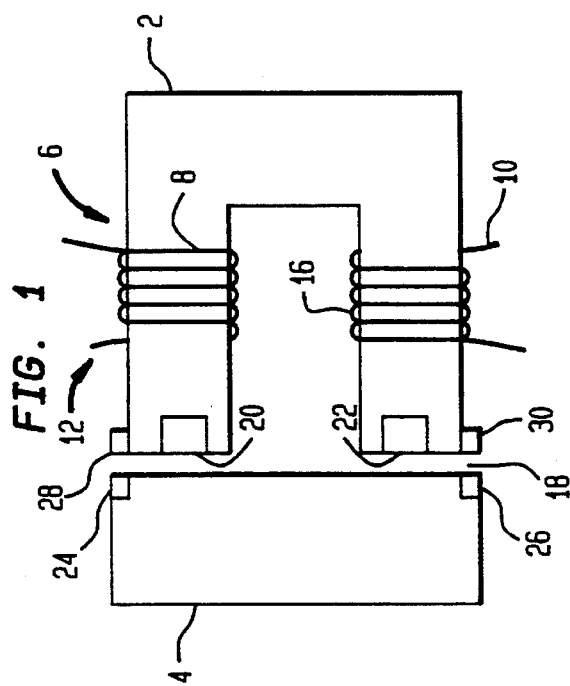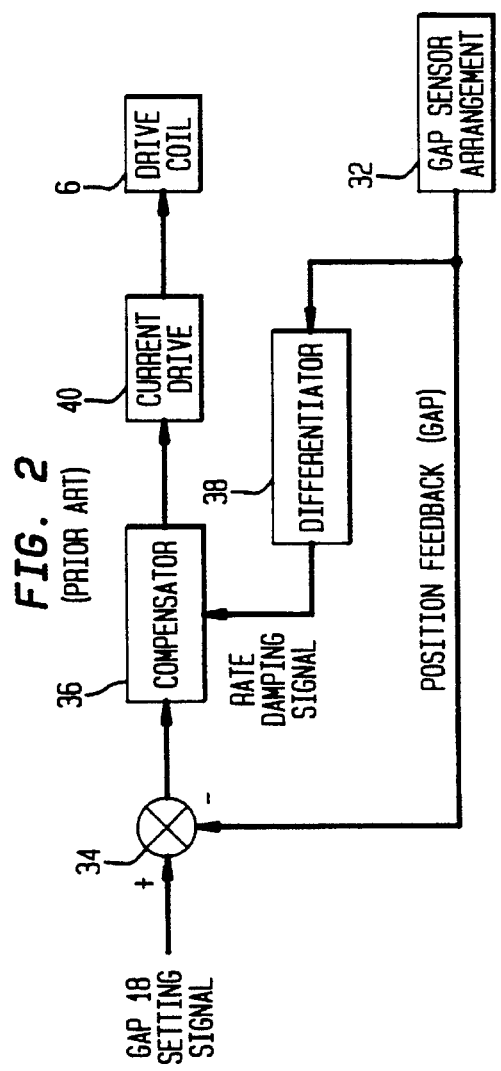
FIG. 1
FIG. 2 (PRIOR ART)

ARRANGEMENT USING SENSED MAGNETIC FLUX FOR RATE DAMPING AND VIBRATION SUPPRESSION

BACKGROUND OF THE INVENTION

This invention relates generally to an arrangement for sensing position rate of change feedback information in a magnetic circuit such as may be used for rate damping and vibration suppression in a magnetic forcer system.

Sensing position rate of change (rate) feedback information for the purposes described has heretofore been accomplished using variations in inductance, eddy current properties and capacitance, or position differentiation. Rate feedback signals so provided are often noisy or, after differentiation, become sensitive to noise. The disadvantageous noise conditions are often the result of stray magnetic or electric fields, or stray capacitances when a capacitance sensor is used. The present invention, senses magnetic flux, or a parameter related thereto, and thus overcomes problems associated with the aforenoted noise conditions.

SUMMARY OF THE INVENTION

This invention contemplates an arrangement for sensing position rate of change (rate) feedback information in a magnetic circuit such as may be used for rate damping and vibration suppression in a magnetic forcer system, wherein sensed magnetic flux is used in conjunction with a differentiated forcer position signal to provide a rate damping signal. The sensed magnetic flux is used to synthesize an inertial velocity signal. The inertial velocity signal is used as a damping input to a closed position control loop. Since magnetic flux ($f_l$) and force (F) are related, $F=K(f_l)^2$ and acceleration (A) is related to force (F) and mass (M), $A=F/M$, integration of a processed flux signal provides a signal proportional to inertial velocity. The arrangement is advantageous in that it results in lower noise, higher gain and higher static and dynamic stiffness of the forcer system. Furthermore, a flux based accelerometer signal can also be used to suppress structural vibrations in the forcer system, as may be likely to occur.

BRIEF DESCRIPTION OF THE DRAWINGS

FIG. 1 is a diagrammatic representation illustrating a magnetic circuit according to the invention.

FIG. 2 is a block diagram illustrating rate damping derived according to the prior art.

DETAILED DESCRIPTION OF THE INVENTION

Figure 3:
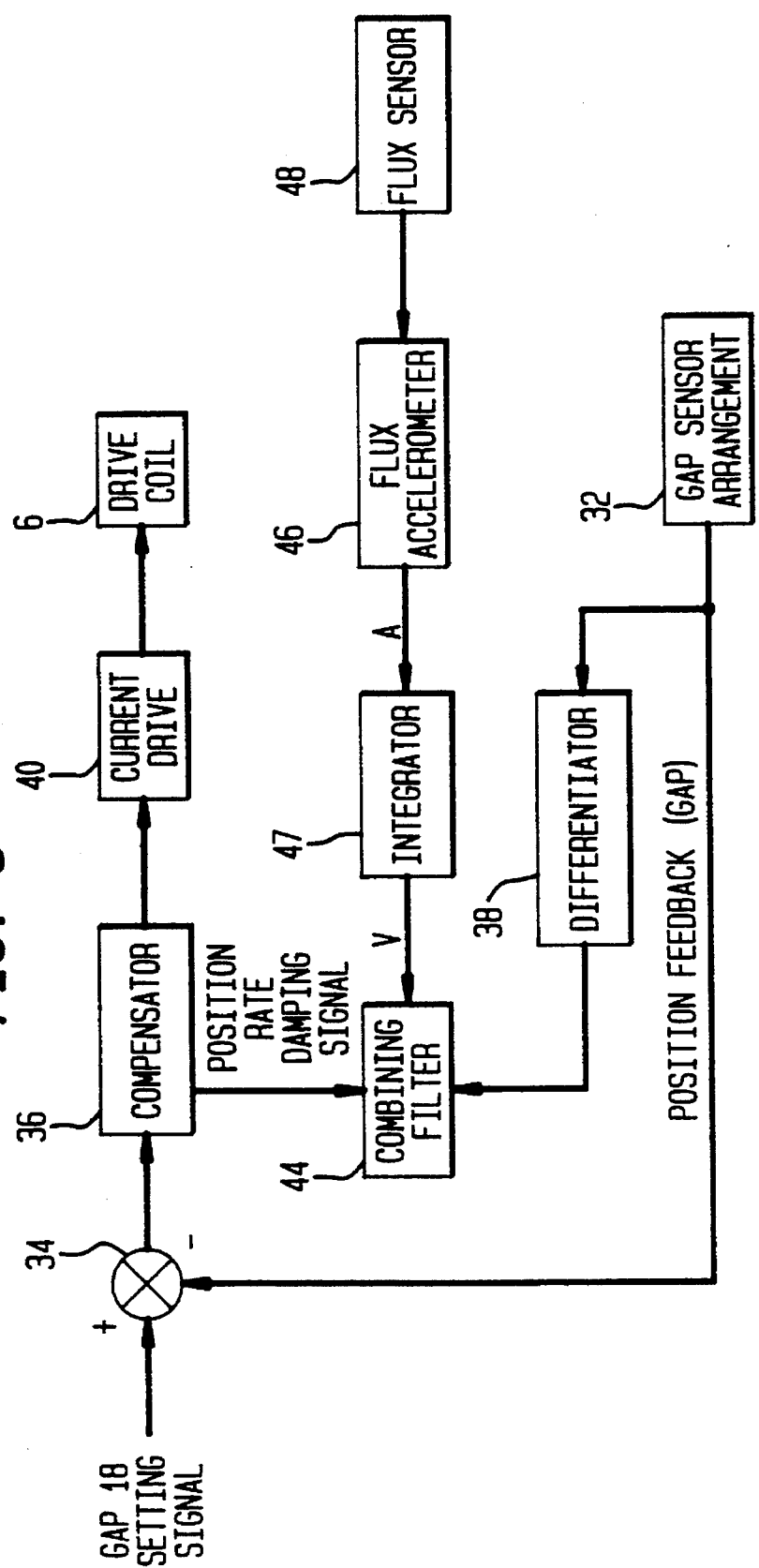
FIG. 3 is a block diagram illustrating rate damping derived from a flux accelerometer according to the present invention.

With reference first to FIG. 1, the orientation of a flux rate sensor coil in relation to a drive or forcer coil in a magnetic circuit is illustrated. Thus, a stator is designated by the numeral 2 and a rotor is designated by the numeral 4. Stator 2 carries a drive coil 6 having legs 8 and 10. Hall Effect devices 20 and 22 are embedded in stator 2 to sense magnetic flux within an air gap 18 which separates stator 2 and rotor 4. Gap sensing devices 24 and 26 are embedded in rotor 4 and gap sensing devices 28 and 30 are embedded in stator 2. The gap sensing devices cooperate to sense gap 18 between stator 2 and rotor 4, and in this regard may be laser type devices for the purposes described.

With reference to the prior art arrangement of FIG. 2, the gap sensor arrangement including sensors 24–30 is designated generally by the numeral 32 and provides a position feedback (gap) signal. The signal from gap sensor arrangement 32 is applied to a summing means 34 which sums the signal with a signal corresponding to a particular setting of gap 18.

Summing device 34 provides a summation signal which is applied to a current forward loop compensator 36. The position feedback signal from gap sensor arrangement 32 is differentiated by a differentiator 38 and the differentiated signal is applied as a rate damping signal to compensator 36.

Compensator 36 provides a signal which is applied to a current drive device 40, and which current drive device 40 drives drive coil 6 of stator 2.

The prior art arrangement described and illustrated with reference to FIG. 2 suffers from the disadvantages as aforenoted. The arrangement of the present arrangement as shown in FIG. 3 overcomes these disadvantages.

Thus, FIG. 3 shows a form of the invention which uses a flux accelerometer. The position feedback (gap) signal from gap sensor arrangement 32 is applied to summing means 34 which sums the signal with the gap setting signal, as described with reference to FIG. 2. The summation signal from summing means 34 is applied to compensator 36, likewise as described with reference to FIG. 2.

The position feedback (gap) signal from gap sensing arrangement 32 is applied to differentiator 38 and the differentiated signal is applied to a combining filter 44 which provides a rate damping signal. The rate damping signal is applied to compensator 36 which provides the signal for driving current drive device 40, and which current drive device drives coil 6 of stator 2, also as described with reference to FIG. 2.

Combining filter 44 receives a velocity signal V derived from a flux accelerometer 46 in response to flux sensed by a flux sensor designated generally by the numeral 48 and which flux sensor 48 includes Hall Effect devices 28 and 30 shown in FIG. 1. To this extent, the output from flux accelerometer 46 is integrated by an integrator 47 which provides the derived velocity signal.

Thus, in accordance with the prior art arrangement as shown in FIG. 2, a rate damping signal is derived by differentiating the position feedback (gap) signal from gap sensing arrangement 32, and in the form of the present invention as shown in FIG. 3, the rate damping signal is derived by combining and filtering the differentiated signal from differentiator 38 with a derived velocity signal, as will be recognized as an improvement over the prior art.

Figure 4:
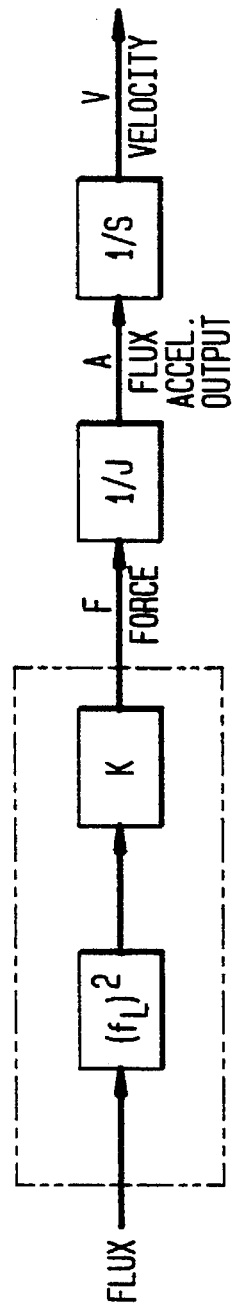
FIG. 4 is a block diagram analytically illustrating the flux accelerometer shown generally in FIG. 3.

FIG. 4 analytically illustrates the operation of flux accelerometer 46. Since force (F) is proportional by a factor K to flux ($f_L$) squared, and acceleration is force (F) divided by mass, an approximation of inertia is (1/M). An acceleration signal (A) is integrated (1/S) to synthesize a velocity signal (V). It is to be noted that in some magnetic systems, a bias flux exists which tends to linearize a current to force relationship. In this case, a scaled value of current may be used to replace the flux to force relationship.

The above is quantitatively illustrated as illustrated below.

The output of drive coil 6 of stator 2 shown in FIG. 1 is Force=K $(I_1/g_1)^2-(I_2/g_2)^2$, for two forcers operating together. If a bias current $I_b$ (or flux) is introduced, $I_1=I_b+I_c$ and $I_2=I_b-I_c$, where $I_c$ is coil current.

It can be shown that $\delta F/\delta(I_c) \cong 2KI_b$ $(1/g_2^2+1/g_1^2) \cong$ constant, and independent of $I_c$.

Figure 5:
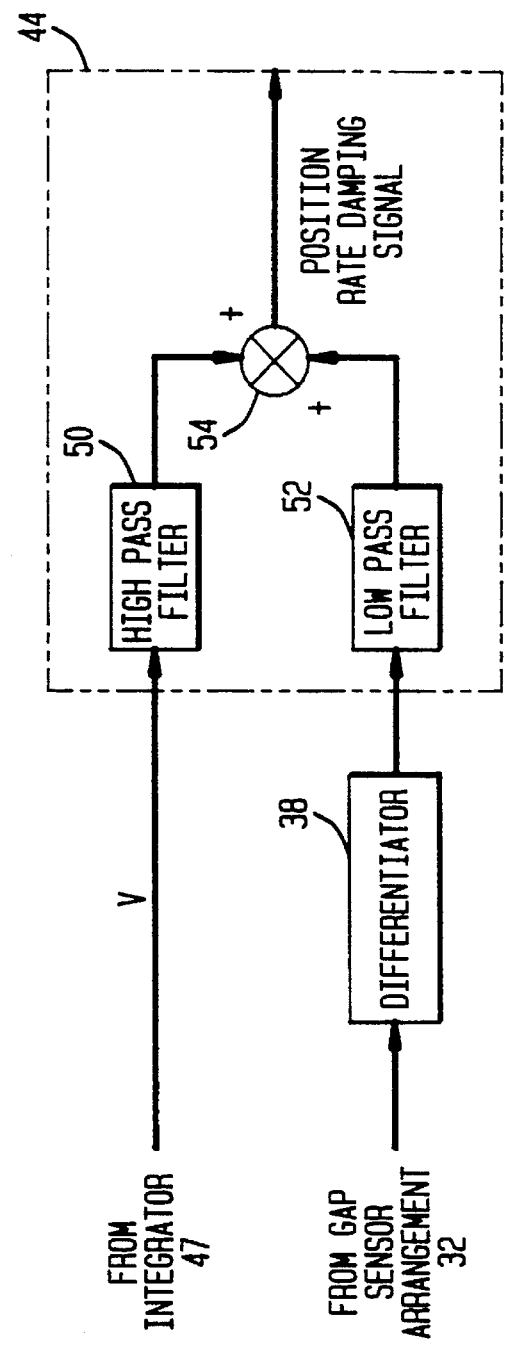
FIG. 5 is a block diagram illustrating a combining filter shown generally in FIG. 3.

A typical implementation of combining filter 44 shown generally in FIG. 3 is illustrated in FIG. 5. Thus, combining filter 44 includes a high pass filter 50 and a low pass filter 52. The signal from differentiator 38 is applied to low pass filter 52 and the velocity signal from integrator 47 is applied to high pass filter 50. The outputs from high pass filter 50 and low pass filter 52 are applied to a summing means 54 which adds the signals and provides the rate damping signal.

Figure 6:
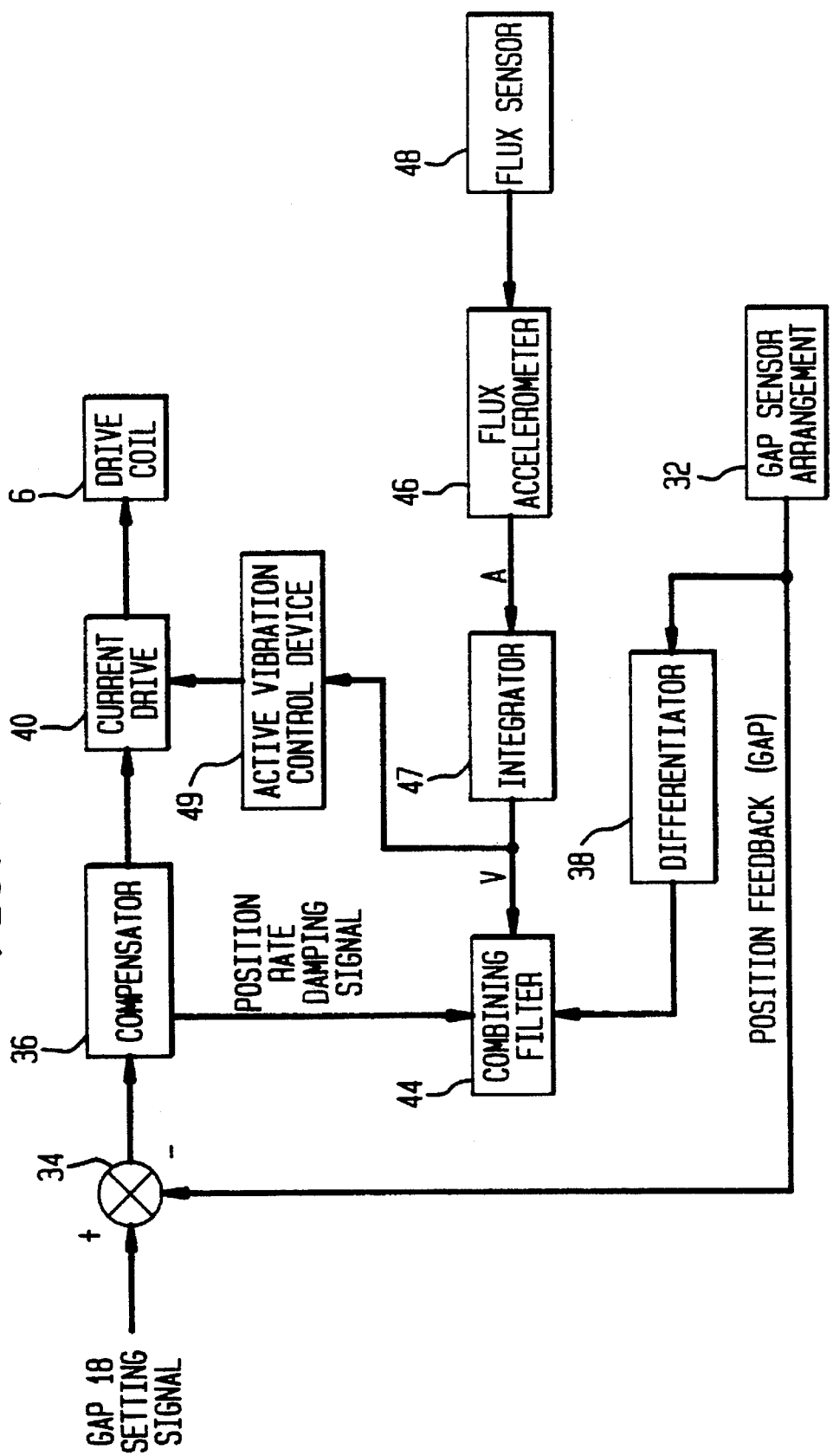
FIG. 6 is a block diagram illustrating active vibration suppression according to the invention.

Given a flux derived velocity signal as heretofore described, this signal is useful for vibration suppression as particularly illustrated in FIG. 6.

Thus, the output from integrator 47 is applied to an active vibration control device 49 which accomplishes closed loop vibration attenuating or open loop disturbance matching. A particular example of open loop disturbance matching is harmonic noise cancellation for accomplishing the purposes described.

It will be appreciated that since magnetic flux is used to synthesize an inertial velocity signal, this signal is used as a damping input to a closed forcer control loop. Since magnetic flux is related to force as aforenoted, and acceleration is force divided by mass, integration of the output of flux accelerometer 46 results in the generation of a signal proportional to inertial velocity. The synthesis of a position rate damping signal as aforenoted is advantageous since it results in lower circuit noise and thus permits higher gains and higher static and dynamic stiffness in the forcer arrangement. Furthermore, given the availability of a gap acceleration signal as described, this signal is used to suppress vibrations reflected in gap variations between stator 2 and rotor 4.

In summary, the present invention features using flux or some derived parameter related to flux in conjunction with a differentiated position feedback or gap signal to synthesize a position rate damping signal. In many cases regarding magnetic systems, no additional sensors are required since frequently flux sensors such as Hall Effect sensors 20 and 22 shown in FIG. 1 are already available.

It is to be noted that in FIG. 1, gap sensors 24, 26, 28 and 30 are cooperatively located so that they must contend with an environment rich in magnetic and electromagnetic fields. This can lead to noise problems necessitating using a combination of differentiated low frequency position information and high frequency velocity information derived from flux and as particularly illustrated in FIG. 5. Accordingly, it is thus possible to reduce the overall noise content of the resulting rate damping signal.

The aforegoing is contrasted to the prior art as illustrated in FIG. 2, wherein position feedback is used to close a position loop on a forcer and to thus act as a static and dynamic suspension spring. Given that the load supported by the forcer is lightly damped, a rate damping signal is required for feedback loop stability. This amounts to differentiation of the position feedback signal from gap sensor arrangement 32 which results in disadvantageous noise as will now be recognized.

With the above description of the invention in mind, reference is made to the claims appended hereto for a definition of the scope of the invention.

What is claimed is:

1. An arrangement using sensed magnetic flux for rate damping and vibration suppression in a magnetic forcer system, comprising:

a magnetic circuit including a rotor and a stator separated by a gap, the stator carrying a drive coil;

magnetic flux sensing means for sensing magnetic flux within said gap;

means for providing a signal corresponding to the gap separating the stator and the rotor;

means for combining said signal corresponding to said gap with a signal corresponding to a predetermined gap and for providing a combined signal;

means for differentiating the signal corresponding to the gap and for providing a differentiated gap signal;

means connected to the magnetic flux sensing means and responsive to the sensed magnetic flux for providing an inertial velocity signal;

means for combining and filtering the differentiated gap signal and the inertial velocity signal and for providing a position rate damping signal; and means connected to the combining means and to the combining and filtering means and responsive to the position rate damping signal and the combined signal for providing a signal for driving the stator drive coil.

2. The arrangement as described by claim 1, wherein the combining and filtering means includes:

a high pass filter connected to the means for providing an inertial velocity signal for filtering said signal;

a low pass filter connected to the means for providing a differentiated gap signal for filtering said differentiated gap signal; and means connected to the high pass filter and the low pass filter for combining the filtered signals therefrom to provide the rate damping signal.

3. The arrangement as described by claim 2, wherein:

the means connected to the high pass filter and the low pass filter for combining the filtered signals therefrom adds said filtered signals.

4. The arrangement as described by claim 1, wherein:

the means for combining said signal corresponding to the gap with a signal corresponding to a predetermined gap sums said signals.

5. The arrangement as described by claim 1, wherein the means connected to the combining means and to the combining and filtering means and responsive to the position rate damping signal for providing a signal for driving the stator drive coil includes:

compensator means connected to the combining means and to the combining and filter means; and current drive means connected to the compensator means for providing the signal for driving the stator drive coil.

6. The arrangement as described by claim 5, including:

active vibration control means connected to the means for providing an inertial velocity signal and to the current drive means and responsive to the inertial velocity signal for providing closed loop vibration attenuation and open loop disturbance matching to the current drive means.

7. The arrangement as described by claim 1, wherein the means connected to the magnetic flux sensing means and responsive to the sensed magnetic flux for providing an inertial velocity signal includes:

flux accelerometer means connected to the flux sensing means and responsive to the sensed flux for providing a flux acceleration signal; and integrating means connected to the flux accelerometer for integrating the flux acceleration signal therefrom to provide the inertial velocity signal.

8. A method using sensed magnetic flux for position rate damping and vibration suppression in a magnetic forcer system, comprising the steps of:

separating a rotor and a stator by a gap;

supporting a drive coil on the stator;

combining a signal corresponding to the gap between the stator and the rotor with a signal corresponding to a predetermined gap for providing a combined signal;

differentiating the signal corresponding to the gap for providing a differentiated gap signal;

sensing magnetic flux within the gap;

using the sensed magnetic flux for providing an inertial velocity signal;

combining and filtering the differentiated gap signal and the inertial velocity signal for providing a position rate damping signal; and using the position rate damping signal for driving the drive coil supported on the stator.

9. The method as described by claim 8, including the steps of:

filtering the inertial velocity signal with a high pass filter;

filtering the differentiated gap signal with a low pass filter; and combining the high pass and the low pass filtered signals.

10. The method as described by claim 9, wherein:

combining the high pass and the low pass filtered signals includes adding said signals.

11. The method as described by claim 8, wherein:

combining a signal corresponding to the gap between the stator and the rotor with a signal corresponding to a predetermined gap includes summing said signals.

12. The method as described by claim 8, including the steps of:

providing a flux acceleration signal;

integrating the flux acceleration signal to synthesize an inertial velocity signal; and using said inertial velocity signal as an input to a closed magnetic forcer position control loop.

* * * * *

UNITED STATES PATENT AND TRADEMARK OFFICE
CERTIFICATE OF CORRECTION

PATENT NO. : 5,453,675
DATED : Sept. 26, 1995
INVENTOR(S) : R. K. Ushiyama, et al It is certified that error appears in the above-identified patent and that said Letters Patent is hereby corrected as shown below:

On title page,

Please add the following: Item [73]

[ 73 ] Assignee: AlliedSignal Inc.

Signed and Sealed this

Tenth Day of August, 1999

Attest:

Q. TODD DICKINSON

Attesting Officer

Acting Commissioner of Patents and Trademarks